United States Patent Office 3,773,952
Patented Nov. 20, 1973

3,773,952
ALLOXAN-5-THIOSEMICARBAZONE AS AN ANTIBACTERIAL AGENT
John D. Douros, Jr., Littleton, Milan Brokl, Denver, and Al F. Kerst, Littleton, Colo., assignors to The Gates Rubber Company, Denver, Colo.
No Drawing. Filed July 6, 1971, Ser. No. 160,143
Int. Cl. A01n 9/00, 9/22
U.S. Cl. 424—251    14 Claims

ABSTRACT OF THE DISCLOSURE

Alloxan-5-thiosemicarbazone can be used to inhibit and/or prevent the growth of undesirable bacteria, fungi and foliage. This invention is particularly concerned with the bacteriostatic and bactericidal properties of alloxan-5-thiosemicarbazone against species of Erwinia, Staphylococcus, and Salmonella.

BACKGROUND OF THE INVENTION

The chemical literature reveals few subjects, even within the rapidly expanding discipline of biochemistry, which have generated so many patent applications as the areas involving the biochemical uses of compounds which contain the barbituric acid nucleus,

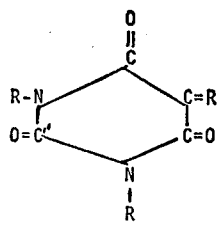

where R represents various substituents. Representative biochemical uses of such compounds are found in U.S. Pats. 2,561,688; 2,605,209; 2,725,380; 2,820,035; 2,887,487; and 3,102,072. However the antibacterial, antifungal and defoliant properties of alloxan-5-thiosemicarbazone have not previously been discovered.

SUMMARY OF THE INVENTION

According to the present invention, it has been found that alloxan-5-thiosemicarbazone

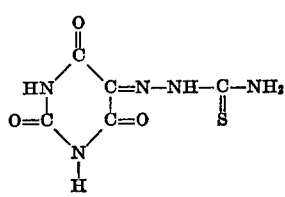

when present in effective quantities in a very effective cotton defoliant, as well as a bactericidal, and fungicidal agent.

The alloxan-5-thiosemicarbazone used in the present invention was prepared according to the following technique:

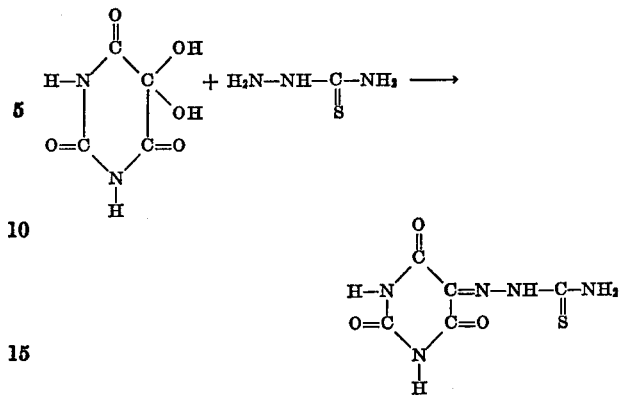

wherein 8.0 gr. (0.05 mole) of alloxan monohydrate, see, W. Hartman and O. Sheppard, Org. Syn. Coll., vol. III, 37 (1955); J. Sperand and T. Daboirch, Org. Syn. Coll., vol. III, 39 (1955); and A. Holmgren and W. Wenner, Org. Syn. Coll., vol. IV, 23 (1963), and 4.56 gr. (0.05 mole) of thiosemicarbazide (Sigma Co. grade) are treated with 250 ml. of a water-ethanol mixture (1:1) in a 500 ml. flask. The mixture is refluxed in a water bath for 30 minutes. A yellow precipitate of the condensation product forms in a few seconds. After the reaction is substantially complete the reaction mixture is cooled and the precipitate separated on a sintered glass funnel, washed with small portions of water several times and finally washed with ethanol. It is then dried in a desiccator under vacuum for 2–3 hours. The yield is 10.6 gr. (98.5% of theory).

DESCRIPTION OF THE PREFERRED EMBODIMENTS

Example I.—Antibacterial and antiyeast activity

The in vitro effectiveness of alloxan-5-thiosemicarbazone against bacteria and yeast species is established in the following manner. One loopful of each of the investigated bacteria or yeast is transferred from agar slants to 10 ml. of trypticase soy broth and incubated at 37° for 18 hours. At the end of this period, the bacteria or yeast is seeded into the same medium (1.5–2% agar) in which the original inoculum was prepared. The bacteria is then seeded at 1 ml. of inoculum per 250 ml. of medium, which is equivalent to at least $1 \times 10^6$ cells/ml. as determined by dilution platecount or nephelometer readings. The resultant mixtures are poured into heat-resistant sterile petri dishes at a temperature of 45° C. Analytical filter paper discs 1.2 cm. in diameter are used for the agar diffusion technique. Each disc is saturated with 0.08 ml. of the solubilized alloxan-5-thiosemicarbazone compound (100 µg./disc) in a suitable carrier and placed on the surface of the hardened agar. The plates are then incubated at 37° C. for 18 hours. The activity of the alloxan-5-thiosemicarbazone compound is established by measuring the zone of inhibition in centimeters. Untreated control plates are used as a basis for comparison and these exhibit a profuse growth of bacteria. The results of these tests are as follows:

| Gram positive and Gram negative bacteria | Zone of inhibition in centimeters | | |
|---|---|---|---|
| | 1,000, µg./disc | 100, µg./disc | 10, µg./disc |
| Streptococcus hemolytic—Group A | 3.2 | 2.7 | 2.1 |
| Streptococcus hemolytic—Group B | 3.5 | 2.9 | 2.3 |
| Xanthomonas phaseoli—ATCC No. 9563 | 3.9 | 3.2 | 2.1 |
| Staphylococcus aureus—ATCC No. 209P | [1] 2.8 | [1] 2.1 | 1.0 |
| Escherichia coli—ATCC No. 9637 | 1.2 | 0 | 0 |

See footnote at end of table.

TABLE—Continued

| Gram positive and Gram negative bacteria | Zone of inhibition in centimeters | | |
|---|---|---|---|
| | 1,000, μg./disc | 100, μg./disc | 10, μg./disc |
| Shigella boydii—ATCC No. 9212 | 1.5 | 0 | 0 |
| Shigella boydii—ATCC No. 9905 | 1.4 | 0 | 0 |
| Shigella sonnei—MMV 6654 | 1.7 | 0 | 0 |
| Shigella flexneri Type 6—MMV 760 | 1.0 | 0 | 0 |
| Shigella flexneri Type 4—MMV 6625 | 1.0 | 0 | 0 |
| Shigella dysenteriae Type 2—MMV 6673 | tr | 0 | 0 |
| Salmonella sp.—ATCC No. 7378 | [1] 2.1 | 0 | 0 |
| Salmonella paratyphi—ATCC No. 9281 | 2.8 | 1.9 | 0 |
| Salmonella enteritis—ATCC No. 13076 | 2.7 | 1.7 | 0 |
| Salmonella pullorum—ATCC No. 10398 | 3.2 | 2.3 | tr |
| Salmonella derby—ATCC No. 6960 | 2.6 | 1.7 | 0 |
| Salmonella gallinarium—ATCC No. 9184 | 2.8 | 1.9 | 0 |
| Salmonella typhinmurium—SR-11 | 2.7 | 1.9 | 0 |
| Salmonella typhosa—ATCC No. 19403 | 2.8 | 1.9 | 0 |
| Neisseria gonorrhoeae—ATCC No. 19424 | 3.3 | 2.0 | 1.0 |
| Neisseria intracellularis | 3.4 | 2.2 | 1.1 |
| Neisseria meningitides—ATCC No. 13077 | 3.0 | 2.0 | 1.1 |
| Listeria monocytogenes—ATCC No. 15813 | 0 | 0 | 0 |
| Vibrio fetus—ATCC No. 15296 | 0 | 0 | 0 |
| Vibrio cholerae—ATCC No. 14035 | 0 | 0 | 0 |
| Proteus vulgaris—ATCC No. 4984 | 0 | 0 | 0 |
| Erwinia carotovora—ATCC No. 495 | 1.5 | 0.9 | 0 |
| Mycobacterium smegmatis—ATCC No. 11314 | 0.8 | 0 | 0 |
| Mycobacterium fortuitum, Debos—ATCC No. 4243 | 1.3 | 0 | 0 |
| Mycobacterium avium—ATCC No. 19421 | 1.7 | tr | 0 |
| Mycobacterium bovis—ATCC No. 19274 | 1.1 | 0 | 0 |
| Mycobacterium phlei—ATCC No. 11782, phage host | 1.1 | 0 | 0 |
| Micrococcus tetragena—ATCC No. 10875 | 4.0 | 3.1 | 2.3 |
| Micrococcus melitensis—ATCC No. 19399 | 4.1 | 3.2 | 2.1 |
| Micrococcus lysodeikticus—ATCC No. 4698 | 4.1 | 3.2 | 2.3 |
| Corynebacterium diphtheriae—ATCC No. 19409 | 3.1 | 2.1 | 1.1 |
| Corynebacterium haemolyticum—ATCC No. 9345 | 3.3 | 2.1 | 1.1 |
| Diplococcus pneumoniae—ATCC No. 6303 | 3.5 | 2.6 | 1.4 |
| Hemophilus hemolyticus—ATCC No. 10014 | 2.1 | 1.0 | 0 |
| Hemophilus influenzea—ATCC No. 19418 | 2.0 | tr | 0 |
| Hemophilus parainfluenzae—ATCC No. 7901 | 2.0 | tr | 0 |
| Hemophilus suis—ATCC No. 19417 | 2.0 | 1.0 | 0 |
| Hemophilus vaginalis—ATCC No. 14018 | 2.1 | 1.1 | 0 |
| Pseudomonas aeruginosa—ATCC No. 10145 | 1.0 | 0 | 0 |
| Pseudomonas aeruginosa—ATCC No. 8709 | 1.0 | 0 | 0 |
| Pseudomonas aeruginosa—ATCC No. 12055 | 1.1 | 0 | 0 |
| Pseudomonas aeruginosa—28 | 1.0 | 0 | 0 |
| Pseudomonas maltophilia—G 107 | 1.0 | 0 | 0 |
| Pseudomonas—K997 | 1.1 | 0 | 0 |
| Pseudomonas—K966 | 1.0 | 0 | 0 |

[1] Hazy zone.

NOTE.—tr=Trace.

This data indicates that alloxan-5-thiosemicarbazone compounds can be used to inhibit many important types of diseases. For example, they can be used against:

| Bacteria: | Disease produced |
|---|---|
| Staphylococcus aureus | Major cause of bovine mastitis. |
| Streptococcus faecalis | Bacterial endocarditis. |
| Escherichia coli | Cause of scours and secondary cause of bovine mastitis. |
| Proteus vulgaris | Major cause of fish disease (trout, pike). |
| Pseudomonas aeruginosa | Numerous animal and plant infections are caused by various pseudomonads. Urinary infections are notable examples. |
| Erwinia carotovora | Various species of Erwinia attack commercial crops of carrots, tobacco, potatoes, squash, et cetera. |
| Xanthomonas phaseoli | Various species of Xanthomonas cause a variety of diseases in plants such as sugar cane, rice, sugar beets, cotton, walnuts, wheat, rye, barley, beans, et cetera. |

The demonstrated antibacterial activity of alloxan-5-thiosemicarbazone compounds against *Staphylococcus aureus* and *Escherichia coli* is of particular interest to the field of pharmacology since the disclosed activity indicates that these compounds can be formulated as powders, salves, and ointments for administration in the treatment of burns and bacterially induced inflammations such as abscesses, dermatitis, rashes and the like, particularly in domestic animals.

Although the precise mode of action whereby alloxan-5-thiosemicarbazone inhibits bacteria growth is not completely understood, it is believed that the alloxan-5-thiosemicarbazone compounds of this invention may serve as chemical antagonists; that is, as chemicals which compete with enzymes essential to the development of many bacteria. Since enzymes perform their catalytic function by virtue of their affinity for their natural substrate; any compound resembling a substrate in its chemically critical aspect may also have an affinity for the enzymes. If this affinity is great enough, the analog will displace the normal substrate from the enzyme and will prevent the growth reaction from taking place. It is believed that alloxan-5-thiosemicarbazone has a chemical affinity for an essential site one one enzyme necessary for bacterial growth and life.

The alloxan-5-thiosemicarbazone formulations of this invention can also contain other therapeutically valued supplements such as local anesthetics, irradiated oils, and other medicinal substances. When used for these or similar purposes, alloxan-5-thiosemicarbazone may be incorporated in any therapeutically acceptable carrier such as oils, salves and ointments, together with adjuvants comprising surface active agents, detergents, dispersing agents, stabilizers and other modifiers which may facilitate the handling and application of the antibacterial material. In the case of the in vitro applications of the compositions of this invention, it is difficult to predict with precision what in all cases will constitute a therapeutic dose even on a weight basis. Variable factors such as type, duration and severity of infection and mode of administration may be determining factors for the establishment of therapeutic doses.

Those skilled in the art will recognize that the above data indicates that the scope of this invention should not be limited to any particular disease species or to any particular type of animal or plant life. For example, the noted activity of alloxan-5-thiosemicarbazone against *Erwinia carotovora* suggests that this compound will also prove to be of value against such other Erwinia species as *Erwinia amylovora*, *Erwinia atroseptica* and *Erwinia vitivora*. Erwinia species are known to cause diseases of apples, carrots, tobacco, potatoes and squash.

Example II—Protection of apple seedlings against *Erwinia carotovora*

The test procedures used to establish the efficacy of alloxan-5-thiosemicarbazone against *Erwinia carotovora*, are as follows. MacIntosh apple seedlings in the true-leaf stage, grown from seed under greenhouse conditions are mounted on a compound turntable and sprayed at 30 pounds pressure with an alloxan-5-thiosemicarbazone solution at the concentrations indicated below. The alloxan-5-thiosemicarbazone is prepared for spraying by dissolving it in a suitable solvent such as acetone, methyl alcohol or ethyl alcohol and then diluting it to the desired concentration with deionized water containing wetting and dispersing agents.

After the treated seedlings have dried, they were placed among diseased *Erwinia carotovora* apple seedlings, and subjected to an initial spore shower by dusting with spores from diseased plants and then left undisturbed in place for approximately ten days. By this procedure treated plants are subjected to the cited initial spore shower as well as to continuing natural infection pressure from the surrounding inoculum. Observations ten days after initial inoculation are used to determine the duration of effectiveness of treatments.

Untreated controls reflected a 75–100% leaf area diseased at this time. The effectiveness of treatment was determined by direct comparison with untreated inoculated controls. Captan was used as a reference standard. The results of these tests are as follows:

| Alloxan-5-thiosemicarbazone: | | |
|---|---|---|
| Concentration, p.p.m. | 100 | 750 |
| Percent control | 82 | 100 |

Example III—Antifungal activity

The antifungal activity of alloxan-5-thiosemicarbazone compounds is established by treating *Fusarium oxysporum, Fusarium roseum, Rhizopus nigricans, Rhizopus stolonifer, Aspergillus niger* and *Alternaria solani* test fungi in the following manner: One loopful of each of the tested viable fungi cultures, spores and mycelia is transferred from an agar slant to an 80 ml. portion of the nutrient broth composed of oatmeal agar, Czapeks, Sabouraud and deionized water to volume. The 80 ml. portion of the fungi and broth is then placed in a sterile shake flask (300 ml.) and the flask is placed on a rotary shaker for 96 to 120 hours at room temperature. At the end of this incubation time period, 10 ml. of the liquid are homogenized and placed in another sterile shake flask (300 ml.) containing 80 ml. of the above nutrient broth and 60 p.p.m. of alloxan-5-thiosemicarbazone. The flasks are placed on a rotary shaker operating at 240 r.p.m. at room temperature for 3 to 9 days. After this second incubation time, the flasks are taken off and examined for visible fungal growth and mycelial weights are determined. Untreated controls are used as the basis of comparison and these display profuse fungal growths containing species of Fusarium, Rhizopus, Aspergillus and Alternaria. The results of these tests indicate that the alloxan-5-thiosemicarbazone compounds of this invention impart a substantial degree of inhibition of fungal growth at 60 p.p.m. The results of these tests were as follows:

| Fungi: | Control at 60 p.p.m., percent |
|---|---|
| Fusarium | 42 |
| Rhizopus | 48 |
| Aspergillus | 56 |
| Alternaria | 37 |

Example IV—Antifungal and antiyeast activity

To further define the antifungal activity of alloxan-5-thiosemicarbazone seeded agar plates are prepared by transferring the cultures from slants washed with saline or phosphate buffers to the surface of hardened Sabouraud-Dextrose agar plates. Again, as in the case of Example I, the alloxan-5-thiosemicarbazone is tested by impregnating filter paper discs (1.27 cm. in diameter) with 0.08 ml. of the solubilized alloxan-5-thiosemicarbazone compounds (100 µg./disc) and placing them on the surface of the hardened agar. The plates are then incubated at 30° C. for 18 hours. The activity of alloxan-5-thiosemicarbazone is established by measuring the zone of inhibition in centimeters. Untreated control plates are used as a basis for comparison and these exhibit a profuse growth of bacteria. The results of these tests are as follows:

| Microorganism | Zone of inhibition in centimeters | | |
|---|---|---|---|
| | 1,000, µg./disc | 100, µg./disc | 10, µg./disc |
| *Aspergillus niger*—ATCC No. 1004 | 3.9 | 2.0 | 1.1 |
| *Alternaria solani*—ATCC No. 6396 | 4.0 | 1.6 | 1.0 |
| *Rhizopus stolonifer*—ATCC No. 10404 | 4.7 | 3.8 | 1.7 |
| *Fusarium oxysporum*—UFCC 1122 | 1.0 | 1.2 | tr |
| *Candida albicans*—SRI 523 | 3.8 | 2.1 | 1.1 |

Example V—Secondary fungal screen

A secondary screen using the techniques of Example IV produces the following results at the alloxan-5-thiosemicarbazone concentrations indicated:

| Microorganism | Concentration | | |
|---|---|---|---|
| | 1,000, µg./disc | 100, µg./disc | 10, µg./disc |
| *Rhodotorula sp.*—Duke | 4.1 | 3.0 | 2.1 |
| *Rhizopus stolonifer*—ATCC No. 10404 | 4.7 | 3.8 | 1.7 |
| *Fusarium roseum*—UFCC 1166 | 1.6 | 1.2 | tr |
| *Fusarium oxysporum* plus *cubense*—UFCC 1122 | 0.9 | 1.2 | tr |
| *Scopulariopsis sp.* SRI | 0 | 0 | 0 |
| *Aspergillus niger*—SRI | 3.9 | 2.0 | 1.1 |
| *Aspergillus niger* | 3.8 | 3.0 | 1.1 |
| *Aspergillus sydowi*—ATCC No. 1017 | 3.7 | 1.9 | 1.0 |
| *Aspergillus nidulans*—ATCC No. 10074 | 3.9 | 2.0 | 1.1 |
| *Aspergillus flavus*—ATCC No. 9643 | 3.1 | 1.5 | tr |
| *Aspergillus amstelodami*—ATCC No. 1001 | 3.7 | 2.0 | 1.1 |
| *Aspergillus fumigatus* | 3.9 | 2.1 | 1.2 |

Example VI—Cotton defoliant properties

Alloxan-5-thiosemicarbazone cotton defoliant properties were established by tests which indicate the following efficacy at the concentrations indicated.

| Concentration, lbs./acre | 10 | 5 | ½ |
|---|---|---|---|
| Percent defoliation | 100 | 75 | 55 |

It will also be recognized by those skilled in the art that other protectant, systemic and eradicant procedures may provide detection of other biological activities. Pathogens representative of Phycomycetes, Ascomycetes, Basidiomycetes and the *Fungi imperfecti* may provide indices of other fungicidal activity. Additional pathogens and appropriate host organisms may well afford other opportunities to further define the degree and spectrum of the activity disclosed in this invention. Since no firm rules of procedure can be laid down for the sequence of such evaluations or for the choice of pathogens, alloxan-5-thiosemicarbazone must be considered on the basis of its demonstrated performance in such primary evaluations and then progressively judged in subsequent studies. A wide range of pathogens, representative of economically important diseases, can be used to help define alloxan-5-thiosemicarbazone's biological activity and to assure high degrees of success under field conditions. The following disease organisms, crops and reference standards may be used in such evaluations:

| Disease | Disease organism | Reference compound |
|---|---|---|
| Powdery mildew of cucumbers | *Erysiphe cichoracearu* | Maneb, Karathane. |
| Leaf rust of wheat | *Puccinia rubigo-vera* | Do. |
| Do | *Puccinia rubigo-vera* | Plantvax. |
| Rice blast disease | *Piricularia oryzae* | Blasticidin. |
| Downy mildew of sugar beet | *Peronospora schactii* | Karathane. |
| Downy mildew of lima bean | *Phytophthora phaseoli* | Do. |
| Bean rust | *Uromyces phaseoli* var. *typica* | Maneb. |
| Powdery mildew of wheat | *Erysiphe graminium* | Karathane. |
| Powdery mildew of apple | *Podosphaera leucotricha* | Do. |
| Powdery mildew of roses | *Sphaerotheca pannosa* var. *rosae* | Do. |
| Powdery mildew of cantalope | *Erysiphe cichoracearum* | Do. |
| Leaf spot of whea | *Helminthosporium sativum* | Maneb. |
| Early blight of tomato | *Alternaria solani* | Do. |
| Rice blast disease | *Piricularia oryzae* | Blasticidin. |
| Cercospora leaf spot of sugar beets | *Cercospora beticola* | Maneb. |
| Septoria leaf spot of celery | *Septoria apii-graveolentis* | Do. |
| Apple scab | *Venturia inaequalis* | Cyprex. |
| Common bacterial blight of bean | *Xanthomonas phaseoli* | Streptomycin sulfate. |

Wherever possible, the applicants recommend the use of "in vivo" procedures to test the alloxan-5-thiosemicarbazone compositions of this invention to demonstrate their efficacy under more realistic conditions. However, not all pathogens lend themselves to such techniques. In order to provide additional spectrum definitions, the following fruit-rotting, storage decay and bacterial pathogens may be tested by "in vitro" methods:

| | | |
|---|---|---|
| Brown rot of stone fruits | Sclerotinia fructicola | Captan. |
| Grey mold of fruit and vegetables | Botryis cinerea | Maneb. |
| Rhizopus fruit and vegetable rot | Rhizopus nigricans | Do. |
| Citrus green mold | Penicillium digitatum | Do. |
| Citrus blue mold | Penicillium italicum | Karathane. |
| Bacterial disease of many fruit crops | Pseudomonas syringae | Captan. |
| Bacterial soft rot | Erwinia carotovora | Do. |

In their plant protection aspects, the alloxan-5-thiosemicarbazone compounds of this invention may be used in the manner known to the organophosphorus crop protection art; that is, they can be made up in solid or liquid formulations. Examples of solid formulations are dust, wettable powders, granules and pellets. As a dust, alloxan-5-thiosemicarbazone compounds may be dispersed in powdered solid carriers such as talc, soaps, soapstone, attapulgus clay as well as other finely divided solids known to the dusting art. When formulated as wettable powders, the active component may be employed in conjunction with inert fillers which may be of the clay type carrier or non-clay type, in conjunction with various combinations of wetting agents and emulsifiers which permit the adaptation of the concentration as a free-flowing powder for dispersion in the field.

Each of these carriers may in turn contain other carriers or extenders which are ordinarily non-reacting or inert substances such as sand, clays, talc, sawdust, alkaline earth carbonates, oxides, phosphates and the like as well as diatomaceous earth, micas or other suitable materials. When liquid formulations are desired, liquid extenders, dilutants or carriers of a non-reactive nature may be utilized. Examples of such materials are alcohols, ketones, glycols, aromatic hydrocarbons, petroleum fractions such as octane and various other distillates. From these considerations, it will also be recognized that the above formulations with slight modifications may be used in the field of animal husbandry as dusting powders and salves.

Where it is desired to use the aforementioned wettable powders or liquid formulations, either emulsified, dispersed or suspended in water or other fluids, one or more of the class of materials herein referred to as adjuvants can also be incorporated into the powder, dust or liquid formulation. These adjuvants comprise surface active agents, detergents, wettable agents, stabilizers, dispersing agents, suspending agents, emulsifying agents, spreaders, stickers and conditioning agents generally. To their modifying characteristics these adjuvants may facilitate handling and application and frequently enhance or potentiate the alloxan-5-thiosemicarbazone compositions of this invention in their biological activities by mechanisms which are frequently not well understood. A satisfactory but not exhaustive list of these adjuvants appears in "Soap Chemical Specialties," vol. 31, No. 7, p. 61; No. 8, pp. 38–61; No. 9, pp. 52–67; and No. 10, pp. 38–67 (1955). See also, Bulletin No. 607 of the Bureau of Entomology and Plant Quarantine of the United States Department of Agriculture.

An additional advantage of alloxan-5-thiosemicarbazone is its compatibility with a variety of other bactericidal and fungicidal materials. For example, it may be convenient to combine alloxan-5-thiosemicarbazone with one or more other adjuvants, carriers, pesticides, biocides, or fungicides of various structures. For example, alloxan-5-thiosemicarbazone fungicidal inhibitors may be combined with insecticidal materials such as chlordane, benzene hexachlorides, DDT, DDD, and insecticidal carbamates, polychlorinated terpenes, parathions, methoxychlor, insecticidal phosphates, phosphorothioates, phosphorodithioates and with fungicides such as sulphur, quinones, dodecylgaunidine and metal dimethyldithiocarbamates.

There are many other considerations which may make some methods of application more favored than others. These considerations may include the type of organisms on which the compound is to be administered, the degree of activity, the degree of activity toward the particular organism, and side effects. Also to be considered is the cost of production and the characteristic solubility of alloxan-5-thiosemicarbazone in the carrier material.

The broad spectrum of antifungal activity afforded by alloxan-5-thiosemicarbazone can also be utilized in the formulation of disinfectant solutions, paints, coatings, films and polymeric materials in order to protect against disease and rot caused by various fungi species. When used as a disinfectant, suitable formulations may be prepared by mixing the compound with an emulsifying agent in the presence of organic solvents and then diluting it with water to form an aqueous emulsion containing the alloxan-5-thiosemicarbazone. Suitable emulsifying agents include, e.g. alkylbenzenesulfonates, polyalkene glycols, et cetera. Aqueous emulsions of alloxan-5-thiosemicarbazone are particularly suited for use in disinfectant solutions used in washing hospital floors and walls. The following examples further illustrate the antifungal properties of alloxan-5-thiosemicarbazone.

Example VII—Preparation of a vinyl coating resistant to mildew deterioration

A vinyl coating is prepared using a commercially available preparation without the fungal growth inhibitor.

An identical vinyl coating is prepared except that 2% by weight of alloxan-5-thiosemicarbazone is incorporated into the coating formulation.

Two sets of components such as asbestos tubing, silk-wrapped transformers and rayon-wrapped solenoids are obtained. One set is sprayed with the vinyl coating containing inhibitor, the other with the identical coating without inhibitor.

Example VIII—Preparation of plasticizers resistant to mildew

A commercial thermoplastic monomer is divided into portions which are treated as follows.

Portion 1: To the first portion is added 2% by weight of alloxan-5-thiosemicarbazone and 10% by weight of dimethylnaphthalate as plasticizer. The monomer is polymerized and molded into 3-inch diameter discs, ¼ inch in thickness prior to testing.

Portion 2: To this portion is added 2% by weight of alloxan-5-thiosemicarbazone and 10% by weight of butyl isodecylphthalate as plasticizer. The monomer is polymerized and molded as above.

Portion 3: The portion is the untreated control of Portion 1 containing no fungal inhibitor but 10% by weight of dimethylphthalate as plasticizer. Again, the polymerization and molding are identical.

Portion 4: This portion is the untreated control of Portion 2 containing no fungal inhibitor but 10% by weight of butyl isodecylphthalate as plasticizer. The polymerization and molding are as described above.

The two plasticizers were chosen on the basis of their known susceptibility to Fusarium attack under high humidity and temperature conditions.

Example IX—Vinyl coatings and plasticizers for fungal resistance

The vinyl coated articles and controls of Examples VII and VIII are placed in an air-tight high temperature and high humidity chamber maintained at 80° F. and 95% humidity to simulate tropical temperature and humidity conditions. After a month's exposure the vinyl coated articles treated with inhibitor are only slightly attacked by rot while the articles coated with vinyl without the alloxan-5-thiosemicarbazone are well rotted. The two untreated control polymer discs are examined and found to be blackened and mildew rotted. Isolates of Aspergillus, Fusarium and known species of yeasts are prepared from the deteriorated discs. The discs containing the alloxan-5-thiosemicarbazone fungal inhibitor are not adversely affected.

Alloxan-5-thiosemicarbazone can be made up in solid or liquid formulations. Examples of solid formulations are dust, wettable powders, granules and pellets. Solid formulations, particularly floating solid formulations. As a dust, alloxan-5-thiosemicarbazone compounds may be dispersed in powdered solid carriers such as talc, soap, soapstone, attapulgus clay, as well as other finely divided solids. When formulated as wettable powders, the active alloxan-5-thiosemicarbazone component may be employed in conjunction with inert fillers which may be of the clay type carrier or non-clay type in conjunction with various combinations of wetting agents and emulsifiers which permit adaptation as a free flowing powder. Each of these carriers may in turn be combined with other carriers which are ordinarily non-reacting or inert substances such as sand, clays, talc, sawdust, alkaline earth carbonates, oxides, phosphates and the like, as well as diatomaceous earth, micas or other suitable materials.

When liquid formulations are desirable, liquid extenders or carriers of a non-reactive nature may be utilized. These compositions should contain approximately 0.1% to 20% by weight and preferably 0.1% to 3% and most preferably 0.5% to 2% of the active alloxan-5-thiosemicarbazone ingredient. Solvents which may be used in the preparation of such compositions would include alcohols, ketones, glycols, mineral spirits and aromatic solvents such as benzene, xylene, nitrobenzene, dimethylformide. Furthermore, to assist in the rapid and complete dispersion in water systems, these compositions may also contain approximately 5% to 30% by weight and preferably 10% to 15% by weight of surface-active agents. Suitable surface-active agents include sodium dialkyl sulphates, sodium alkylbenzene sulfonates, sodium carboxylates and the non-ionic surfactants such as ethoxylated fatty acid alcohol and amines.

Alloxan-5-thiosemicarbazone is compatible with a wide variety of other bactericidal and fungicidal materials. For example, it may be convenient to combine compositions with one or more of the other bactericides or algaecides. Common fungicides and bactericides such as sulphur, inorganic salts such as copper sulphate, activated colloidal silver compounds, copper naphthenates and zinc acetate, as well as substituted hydrocarbons and quarternary ammonium compounds, may be employed.

Having thus disclosed our invention, we claim:

1. A method of killing bacteria of the genus Corynebacter which comprises applying to a plant infected with said bacteria, a bacteria killing amount of alloxan-5-thiosemicarbazone.

2. A method of killing bacteria of the genus Micrococci, which comprises applying to a plant infected with said bacteria, a bacteria killing amount of alloxan-5-thiosemicarbazone.

3. A method of killing bacteria of the genus Mycobacterium which comprises applying to a plant infected with said bacteria, a bacteria killing amount of alloxan-5-thiosemicarbazone.

4. A method of killing bacteria of the genus Diplococci which comprises applying to a plant infected with said bacteria killing amount of alloxan-5-thiosemicarbazone.

5. A method of killing bacteria of the genus Streptococci which comprises applying to a plant infected with said bacteria, a bacteria killing amount of aloxan-5-thiosemicarbazone.

6. A method of killing bacteria of the genus Shigella which comprises applying to a plant infected with said bacteria, a bacteria killing amount of alloxan-5-thiosemicarbazone.

7. A method of killing bacteria of the genus Salmonella which comprises applying to a plant infected with said bacteria, a bacteria killing amount of alloxan-5-thiosemicarbazone.

8. A method of killing bacteria of the genus Neisseria which comprises applying to a plant infected with said bacteria, a bacteria killing amount of alloxan-5-thiosemicarbazone.

9. A method of killing bacteria of the genus Hemophilus which comprises applying to a plant infected with said bacteria, a bacteria killing amount of alloxan-5-thiosemicarbazone.

10. A method of killing bacteria of the genus Pseudomonas which comprises applying to a plant infected with said bacteria, a bacteria killing amount of alloxan-5-thiosemicarbazone.

11. A method of killing *Staphylococcus aureus* which comprises applying to a plant infected with said *Staphylococcus aureus* a killing amount of alloxan-5-thiosemicarbazone.

12. A method of killing *Xanthomonas phaseoli* which comprises applying to a plant infected with said *Xanthomonas phaseoli* a *Xanthomonas phaseoli* killing amount of alloxan-5-thiosemicarbazone.

13. A method of killing *Escherichia coli* which comprises applying to a plant infected with said *Escherichia coli* an *Escherichia coli* killing amount of alloxan-5-thiosemicarbazone.

14. A method of killing *Erwinia carotovora* which comprises applying a plant infected with said *Erwinia carotovora* an *Erwinia carotovora* killing amount of alloxan-5-thiosemicarbazone.

References Cited

Chemical Abstracts, vol. 60, item 6844h–6845a, 1964.

ALBERT T. MEYERS, Primary Examiner

D. W. ROBINSON, Assistant Examiner

U.S. Cl. X.R.

424—254